(12) United States Patent
Kean et al.

(10) Patent No.: US 10,532,741 B2
(45) Date of Patent: Jan. 14, 2020

(54) METHOD OF USING PREDICTED VEHICLE ACCELERATIONS TO IMPROVE ROLL AND PITCH MEASUREMENT ACCURACY IN A TRACKED MACHINE

(71) Applicant: Deere & Company, Moline, IL (US)

(72) Inventors: Michael G. Kean, Dubuque, IA (US); Craig Christofferson, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 290 days.

(21) Appl. No.: 15/722,564

(22) Filed: Oct. 2, 2017

(65) Prior Publication Data

US 2019/0100205 A1    Apr. 4, 2019

(51) Int. Cl.
*B60W 30/18*    (2012.01)
*B60W 50/00*    (2006.01)

(52) U.S. Cl.
CPC .. *B60W 30/18009* (2013.01); *B60W 50/0097* (2013.01)

(58) Field of Classification Search
CPC ....... B60W 30/18009; B60W 50/0097; B60W 40/00; B60W 40/10; G01C 21/16
See application file for complete search history.

(56) References Cited

U.S. PATENT DOCUMENTS

| 3,633,003 | A | 1/1972 | Talwani | |
|---|---|---|---|---|
| 4,095,271 | A | 6/1978 | Muller | |
| 4,422,147 | A * | 12/1983 | Hanke | G05D 1/063 244/182 |
| 4,897,776 | A | 1/1990 | Urababa et al. | |
| 9,156,452 | B2 | 10/2015 | Kikuchi | |
| 2009/0293615 | A1 * | 12/2009 | Lee | G01P 1/127 73/514.01 |
| 2014/0330479 | A1 * | 11/2014 | Dolgov | B60W 30/16 701/28 |
| 2018/0052006 | A1 * | 2/2018 | Ell | G01C 25/00 |
| 2018/0148036 | A1 * | 5/2018 | Gaither | B60W 20/12 |

* cited by examiner

*Primary Examiner* — Mary Cheung

(74) *Attorney, Agent, or Firm* — Taft Stettinius & Hollister LLP; Stephen F. Rost

(57) ABSTRACT

A work machine includes a vehicular controller, an IMU, an IMU controller, a hydrostatic transmission, and an operator control. The machine can move a commanded machine motion that includes movement of the machine from a first position to a second position or movement of a linkage relative to a chassis. The vehicular controller predicts an acceleration based on the commanded machine motion and communicates the predicted acceleration from the vehicular controller to the IMU controller. The IMU measures a current acceleration and the IMU controller determines an adjusted acceleration from the combination of the predicted acceleration and the current acceleration. The adjusted acceleration is communicated from the IMU controller to the vehicular controller for use by the vehicular controller. The two-way communication between the IMU controller and the vehicular controller continues while the machine is in motion for a more accurate determination of the acceleration and location of the machine.

19 Claims, 5 Drawing Sheets

METHOD OF USING PREDICTED VEHICLE ACCELERATIONS TO IMPROVE ROLL AND PITCH MEASUREMENT ACCURACY IN A TRACKED MACHINE

FIELD OF THE DISCLOSURE

The present disclosure relates to using inertial measurement units to predict an attitude of a tracked machine, and more particularly to a unique technique for improving the accuracy of the inertial measurement units.

BACKGROUND OF THE DISCLOSURE

Many vehicles use inertial measurement units (IMU's) as sensors to predict the attitude of a vehicle in space. IMU's typically include one or more of a three-axis accelerometer and a three-axis gyroscope with sensor fusion algorithms. Generally, when the vehicle is stationary, the accelerometer is used to measure the direction of gravity. Generally, under dynamic conditions such as when the vehicle is moving, the gyroscope acts to measure the rate of change of the vehicle's attitude. These two measurements can be combined to provide a more accurate estimate of the vehicle's attitude.

Many IMU's utilize a vertical gyro sensor fusion algorithm. The vertical gyro assumes that most of the time the IMU does not accelerate in the horizontal plane. One of the detractors of this type of sensor fusion algorithm is that accelerations in the horizontal plane cause errors in the measured attitude of the sensor. As such, the lateral acceleration causes a roll measurement offset error. Other problems occur as a result of a vertical gyro sensor fusion algorithm when the vehicle starts moving. For example, determining when to switch between the three-axis accelerometer and the three-axis gyroscope and how to weight the measurements of the three-axis accelerometer and the three-axis gyroscope in the calculations. Typically, there is a time lag between the moment when the vehicle starts moving and the moment when the algorithm determines the vehicle is moving which results in an error that is inserted into the system. Moreover, the error increases or accumulates as the IMU sensor goes back and forth between the three-axis accelerometer and the three-axis gyroscope which adds more error into the system. Moreover, the start and stop accelerations cause a pitch measurement error.

Thus there is a need for improvement for using inertial measurement units.

SUMMARY

According to one embodiment, a method for adjusting acceleration for a machine that includes a vehicular controller, an inertial measurement unit including an inertial measurement unit controller, and an operator control. The operator control commands the machine to move from a first position to a second position. An acceleration is predicted based on the commanded machine motion from the first position to the second position. The predicted acceleration is communicated from the vehicular controller to the inertial measurement unit controller. A current acceleration is measured with the inertial measurement unit. An adjusted acceleration is determined from the combination of the predicted acceleration and the current acceleration using the inertial measurement unit controller. The adjusted acceleration is communicated from the inertial measurement unit controller to the vehicular controller.

In any embodiment, the method can also include the predicted acceleration includes a predicted pitch measurement and a predicted roll measurement.

In any embodiment, the method can also include the adjusted acceleration includes an adjusted pitch measurement and an adjusted roll measurement.

In any embodiment, the method can also include determining an orientation of the machine that accounts for the adjusted acceleration on the IMU and communicating the orientation from the IMU to the vehicular controller.

In any embodiment, the method can also include determining the adjusted acceleration is calculated with the algorithm $R(t+\Delta t) = \alpha R \text{Tilt} (At - A_{Predicted}) + (1-\alpha)(Rt + (-\omega t \Delta t) \times Rt)$.

In any embodiment, the method can also include the machine having a right hydrostatic transmission and a left hydrostatic transmission.

In any embodiment, the method can also include displaying the adjusted acceleration on a display of the machine.

In any embodiment, a method for adjusting acceleration for a machine includes providing a machine having a vehicular controller, an inertial measurement unit including an inertial measurement unit controller, a hydrostatic transmission, and an operator control, moving the machine a commanded machine motion that includes movement of the machine from a first position to a second position, predicting an acceleration based on the commanded machine motion, communicating the predicted acceleration from the vehicular controller to the inertial measurement unit controller, measuring a current acceleration with the inertial measurement unit, and determining an adjusted acceleration from the combination of the predicted acceleration and the current acceleration using the inertial measurement unit controller.

In any embodiment, the method can include the commanded machine motion including moving the machine in a reverse direction.

In any embodiment, the method can include the commanded machine motion including moving the machine in a forward direction.

In any embodiment, the method can include the determining the adjusted acceleration is calculated with the algorithm $R(t+\Delta t) = \alpha R \text{Tilt} (At - A_{Predicted}) + (1-\alpha)(Rt + (-\omega t \Delta t) \times Rt)$.

In any embodiment, the method can include determining an orientation of the machine that accounts for the adjusted acceleration on the IMU and communicating the orientation from the IMU to the vehicular controller.

In any embodiment, the method can include the IMU having one or more accelerometer sensors and one or more gyroscope sensors.

In any embodiment, the method can include the predicted acceleration having a predicted pitch acceleration measurement and a predicted roll acceleration measurement.

In any embodiment, the method can include the adjusted acceleration having an adjusted pitch acceleration measurement and an adjusted roll acceleration measurement.

In any embodiment, the method can include communicating the adjusted acceleration from the inertial measurement unit controller to the vehicular controller.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
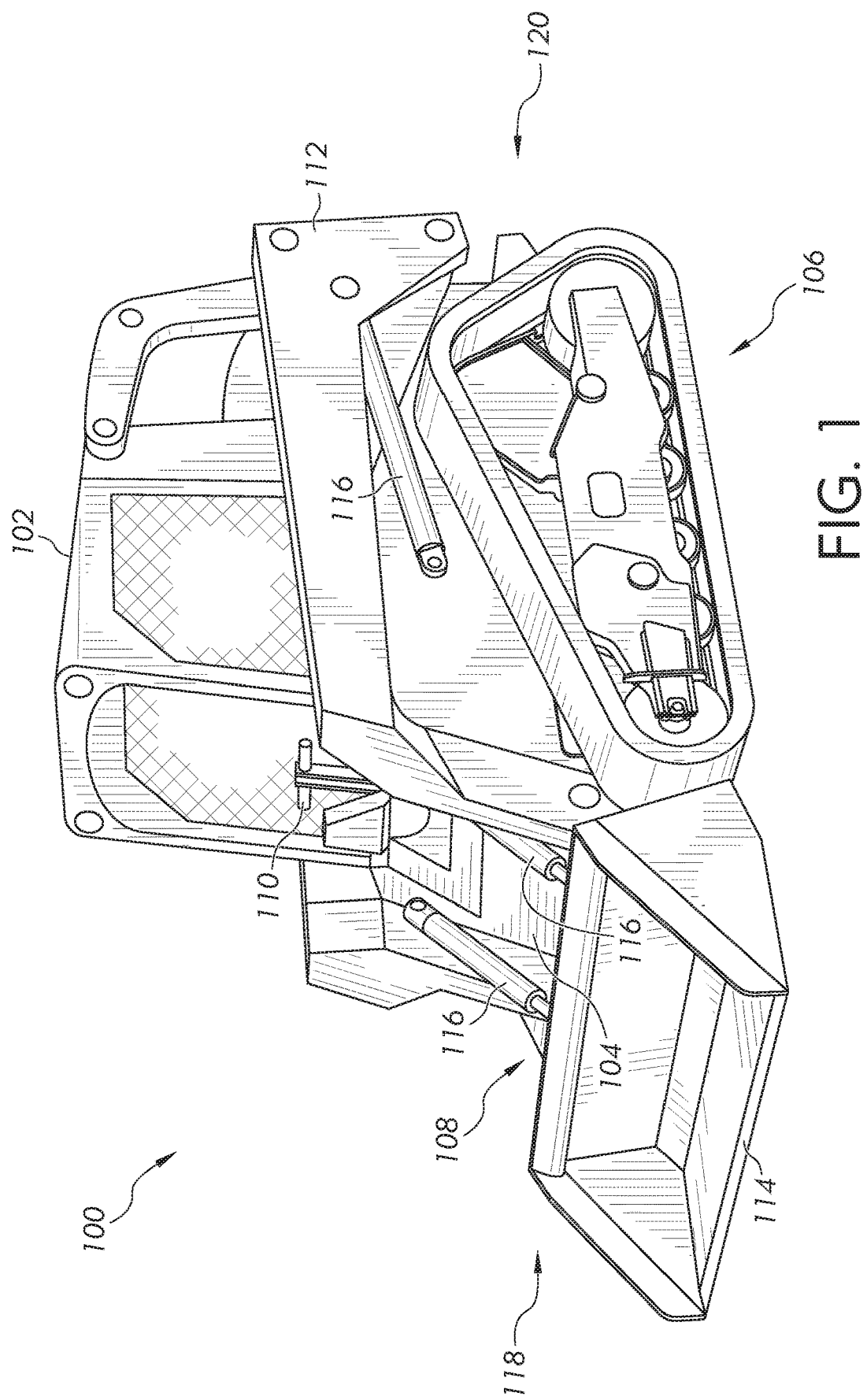
FIG. 1 is a perspective view of a work machine.

Referring now to FIG. 1, a compact track loader or work machine 100 is shown. The work machine 100 may have a front portion 118, a rear portion 120, and a cab 102 coupled to a frame 104. Also coupled to the frame 104 may be a first track assembly 106 and a second track assembly 108 (e.g., one on a leftside of the machine and another on a rightside thereof) that engage and move along the ground during operation. The first and second track assemblies 106 and 108 can each be driven by a drive sprocket (not shown) and a front idler wheel about which a track chain is entrained. A left hydrostatic transmission (not shown) can operably drive the drive sprocket (which may form part of a high reduction gearset) so as to drive the track chain of the left or first track assembly 106 thereby providing motive power for moving the machine 100. A right hydrostatic transmission (not shown) can operably drive the drive sprocket (which may form part of a high reduction gearset) so as to drive the track chain of the right or second track assembly 108 thereby providing motive power for moving the machine 100.

An operator may be positioned in the cab 102 and have access to a plurality of controls 110. The plurality of controls may include joysticks, levers, wheels, push buttons, switches, knobs, dials, and any other known control mechanism for controlling a function of the machine 100. Further, an engine compartment that houses an engine may be supported by the frame 104 wherein the engine can provide the motive power for operating any implements based on the operator's input to the controls 110.

The work machine 100 may also have a boom arm 112 pivotally coupled to the frame at one end and to an implement (e.g., a bucket 114) at an opposite end. The boom arm 112 and the implement or bucket 114 may further be coupled to the frame 104 through one or more actuators 116 that allow the operator to control the positioning of the bucket 114 via the controls 110. Each of the actuators 116 can be controlled mechanically, hydraulically, pneumatically, electrically or by any other means known to the skilled artisan.

While the work machine 100 is shown and described as a compact track loader, this disclosure is not limited in application to compact track loaders. More specifically, any work machine that utilizes an inertial measurement unit or IMU sensor may benefit from the teachings of this disclosure. As such, this disclosure applies to work machines that use a hydrostatic transmission. This disclosure is also applicable to any size of work machine and the compact track loader is only referenced herein as one example of a type of work machine. Accordingly, a skid steer loader, excavator, crawler or any other similar work machine is considered herein with left and right hydrostatic drives that use skid turns. This disclosure is also applicable to any commanded vehicle motion of a work machine that utilizes an IMU or IMU sensor. Some non-limiting examples of commanded vehicle motion include movement of a linkage relative to a chassis or movement of a bucket other implement relative to the chassis.

Figure 2:
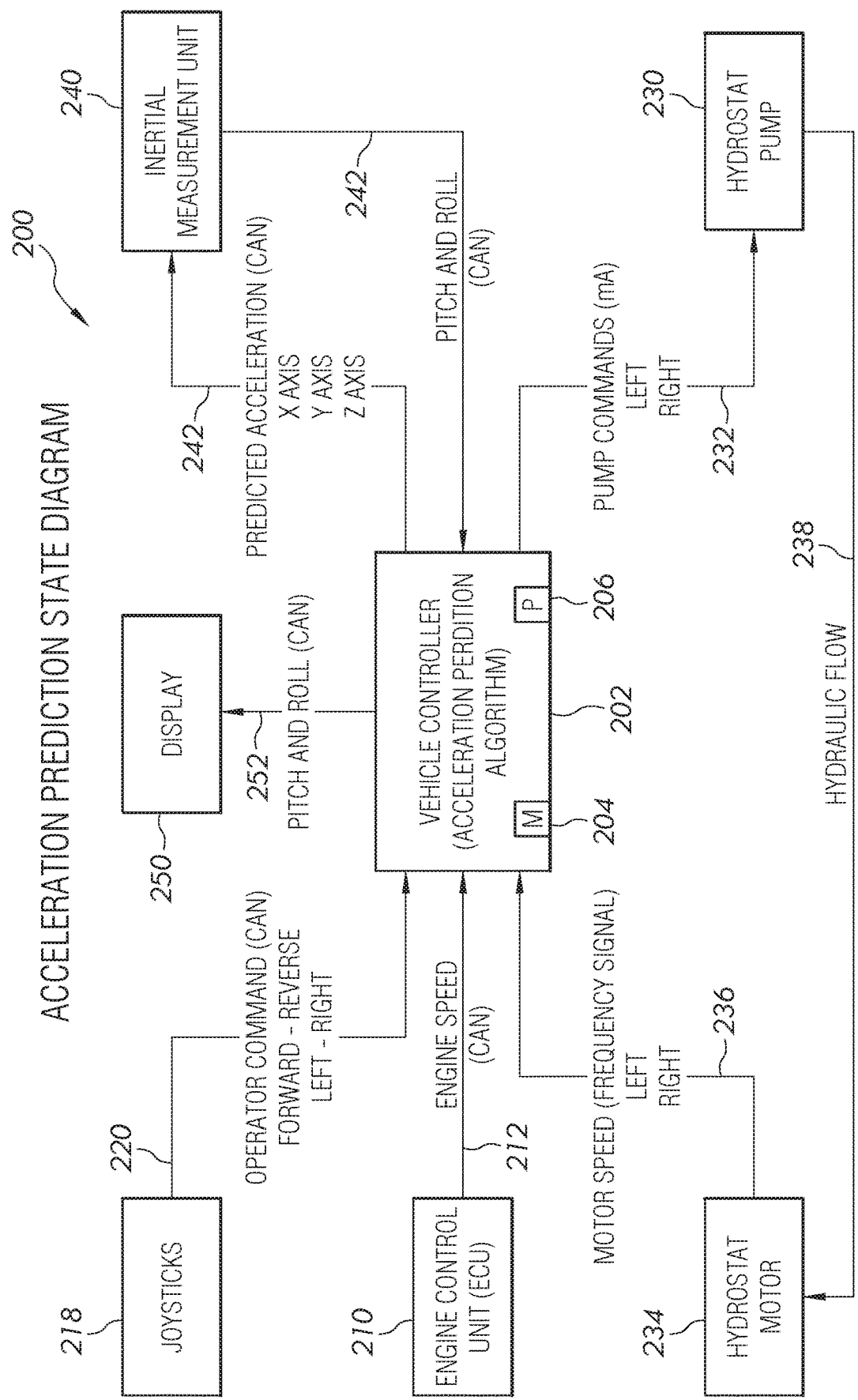
FIG. 2 is a schematic for operating the machine of FIG. 1 and an inertial measurement unit thereof.

In the present disclosure, referring to FIG. 2, the machine 100 includes a control system 200 with a controller 202 for controlling the operation of the machine. The controller 202 can include a memory 204 for storing software, logic, algorithms, programs, a set of instructions, etc. for controlling the machine 100. The controller 202 can also include a processor 206 for carrying out or executing the software, logic, algorithms, programs, set of instructions, etc. stored in the memory 204. The memory 204 can also store look-up tables, graphical representations of various functions, and other data or information for carrying out or executing the software, logic, algorithms, programs, set of instructions, etc. and controlling the machine 100.

The controller 202 can include a plurality of inputs and a plurality of outputs. For instance, the controller 202 can receive a signal from one or more inputs and send a corresponding signal to an output to execute a function or operation. As shown in FIG. 2, one or more of the inputs can be an electrical connection between the controller 202 and an engine control module or unit 210. The electrical connection can be made via a CAN bus 212 or other communication link (e.g., wireless transceivers). Other conventional communication protocols may include J1587 data bus, J1939 data bus, IESCAN data bus, etc. Communication across the CAN bus 212 can include a commanded engine speed, actual engine speed, current engine speed, throttle position, engine torque, and other engine-specific variables.

The controller 202 can also be in electrical communication with different operator input mechanisms. For example, a first operator input mechanism 218 can include a joystick, throttle control mechanism, pedal, lever, switch, or other control mechanism. The first operator input mechanism 218 may be located within the cab 110 of the machine 100. An input command, e.g., a movement of a joystick, applied to the first operator input mechanism 218 can be communicated to the controller 202 via communication link 220. Similarly, the machine 100 can include a second operator input mechanism (not illustrated) located within the cab 110 of the machine 100 for sending another signal to the controller 202. A different communication link can electrically couple the second operator input mechanism with the controller 202. In alternative embodiments each of the first input control mechanism 218 and the second input control mechanism may share a common communication link with controller 202. Similarly, other communication links could be shared amongst multiple components in alternative embodiments. As an example, the first input control mechanism 218 may be a joystick or lever for controlling an implement 114 of the machine 100 and the second input control mechanism may be a throttle control mechanism. In FIG. 1, the implement is shown as a bucket 114, but this disclosure is not intended to be limited to a bucket. Other implements for performing craning, digging, grading, and other operations are contemplated herein.

The controller 202 is in electrical communication with a hydrostatic transmission circuit that includes a hydrostatic transmission pump 230, a hydrostatic transmission motor 234, and a pump controller (not illustrated) that can include and provide a plurality of inputs and a plurality of outputs to the hydrostatic transmission pump 230 and the hydrostatic transmission motor 234. As can be appreciated, there is a left hydrostatic transmission circuit for the left or first track assembly 106 and a right hydrostatic transmission circuit for the right or second track assembly wherein both the left and the right hydrostatic transmissions circuits provide similar information to the pump controller and the controller 202. The controller 202 is in electrical communication via a pump command communication link 232 with the hydrostatic transmission pump 230 to provide pump command information thereto. The controller 202 is also in electrical communication with the hydrostatic transmission motor 234 via a motor communication link 236 to receive motor speed information. The hydrostatic transmission pump 230 is in fluid communication with the hydrostatic transmission motor 234 via a hydraulic flow path 238 that runs between the hydrostatic transmission pump 230 and the hydrostatic transmission motor 234. The hydrostatic transmission pump 230 provides and pumps oil or other hydraulic fluid to the hydrostatic transmission motor 234 and thereby drives the hydrostatic transmission motor 234. The controller 202 provides a pump displacement measurement to the pump controller and the hydrostatic transmission pump 230 which in turn drives the hydrostatic transmission motor 234. The hydrostatic transmission motor 234 thereafter provides a motor speed and/or motor displacement as a frequency signal via the motor communication link 236 to the controller 202.

The controller 202 is also in electrical communication with an Inertial Measurement Unit (IMU) 240 via a CAN bus 242 that provides and receives or exchanges vehicle information with the IMU 240. The electrical communication between the controller 202 and the IMU 240 is a two-way communication in which the controller 202 provides and exchanges information to the IMU 240 and the IMU 240 provides and exchanges information to the controller 202. The IMU 240 is configured to process the information received from the controller 202 along with any measurements received by the IMU 240 and thereafter provide an adjusted measurement to the controller 202 for further use, as described in more detail below. In one embodiment, the IMU 240 is positioned on a chassis or a center of gravity and center of rotation of the machine 100; however, in other embodiments the IMU 240 can be positioned elsewhere on the machine 100.

The controller 202 is in electrical communication with a display 250 via a CAN bus 252. The controller 202 provides information to the display 250 for the operator to review and use as desired.

Figure 4:
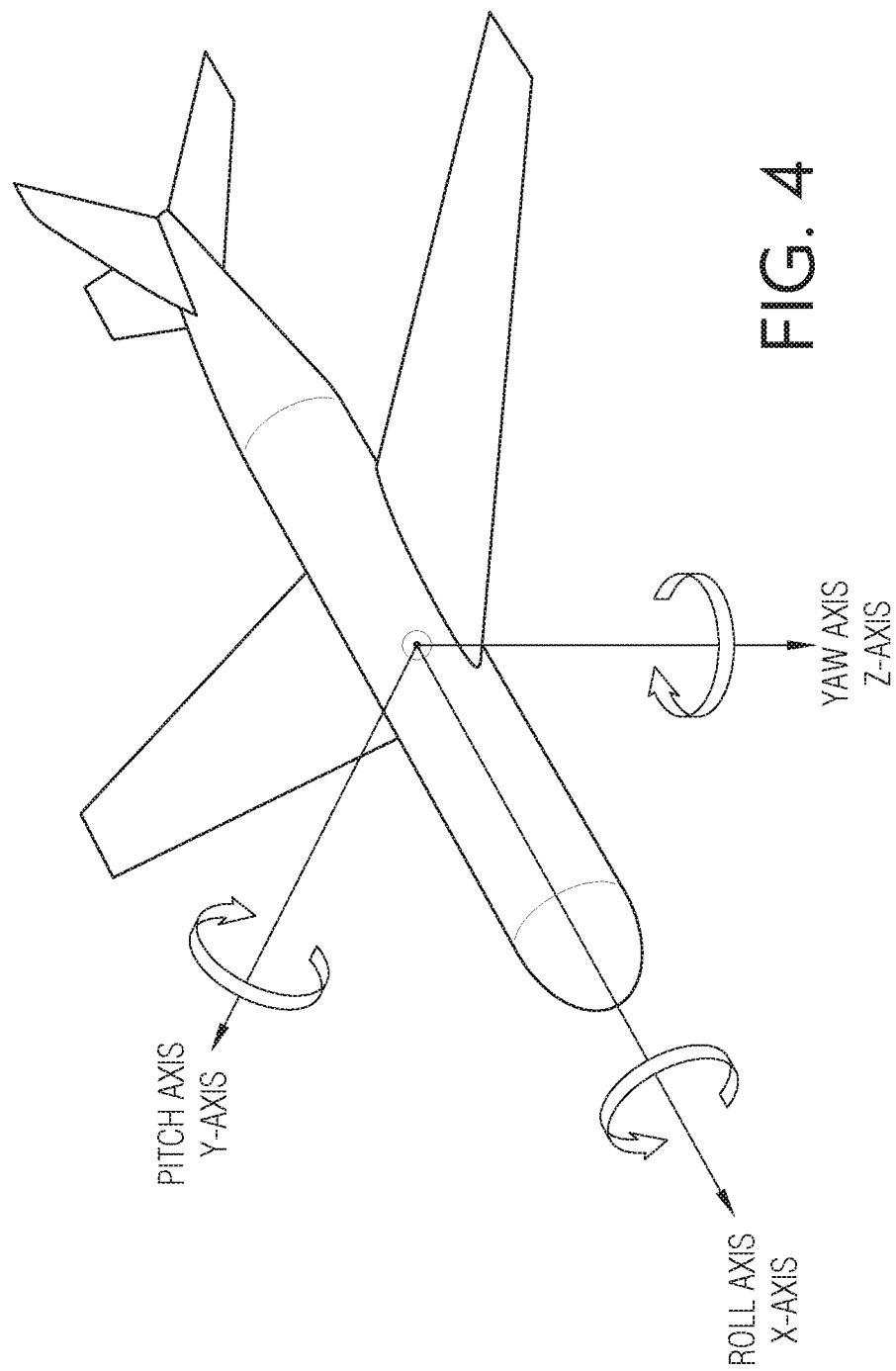
FIG. 4 is an example diagram of an orientation of a machine relative to earth.

IMU 240 includes an accelerometer that measures the static orientation of the machine 100 and a gyroscope that measures the dynamic orientation of the machine 100 for each of the three vehicle axes: pitch (Y axis), roll (X axis), and yaw (Z axis) as illustrated in FIG. 4. As such, the IMU 240 includes a pitch accelerometer, a roll accelerometer, and a yaw accelerometer. The IMU 240 also includes a pitch gyroscope, a roll gyroscope, and a yaw gyroscope. The IMU 240 can output raw sensor data and calculate orientation, e.g., pitch, roll, and yaw. Each of the accelerometers detects a corresponding linear acceleration by measuring gravity and dynamics. The total acceleration is composed of a gravitational component and a dynamic component, wherein the dynamic component causes a change in velocity. Sensor bias, sensor noise, and other errors can affect the measured acceleration. Generally, sensor bias is a small offset in the average signal output of the accelerometer (or gyroscope) which can contribute to pitch or roll angle error. Generally, sensor noise is any unwanted signal generated from the accelerometer (or gyroscope) that interferes with measurement of the desired signal. The noise level will also determine the minimum sensor output that is distinguishable from the background noise of the sensor or noise floor. In the present application, these errors can be minimized or eliminated and the accelerometer can be used over a wider range of operating conditions when accounting for the motion of the vehicle by using a predicted acceleration output along with the actual accelerometer reading as described below.

Each of the gyroscopes detects a corresponding rotation rate by measuring the change in orientation. The gyroscopes measure the true angular rates but have an additional bias error and an additional noise error. Since the gyroscope measurements are integrated to estimate changes in orientation, bias error and noise error lead to drift in the orientation over time as these values are added to the true change in orientation at each step. The gyro bias error is quantified as an angle error and will increase proportionally with time when the gyroscopes output is integrated to produce an angle.

Optionally, the IMU 240 can include a magnetometer for each of the three vehicle axes: pitch, roll, and yaw. Optionally, the IMU 240 can include a global positioning system or GPS in some embodiments.

The roll accelerometer, pitch accelerometer, and yaw accelerometer of the IMU 240 provide Ax which is x component of sensed acceleration, Ay which is y component of sensed acceleration, and Az which is z component of sensed acceleration, respectively. The following accelerometer data is calculated from Ax, Ay, and Az:

$$\theta_{pitch} = \tan^{-1}\left(\frac{-A_x}{\sqrt{A_y^2 + A_z^2}}\right)$$

$$\varphi_{roll} = \tan^{-1}\left(\frac{-A_y}{A_z}\right)$$

wherein θpitch is the pitch angle that is between −90 degrees and 90 degrees and φroll is the roll angle that is between −180 degrees to 180 degrees.

The pitch accelerometer, roll accelerometer, and yaw accelerometer of the IMU 240 may not be accurate due to built in assumptions used in the calculation of the pitch angle and the roll angle. Therefore, any measured horizontal or roll accelerations may include sensor error in the roll accelerometer or in the vertical gyroscope. During a constant speed, constant radius turn the accelerometer will measure some constant acceleration in the Y direction. If the post processing algorithm does not know the vehicle is turning, this lateral acceleration will be interpreted as if the vehicle had a larger roll angle. If the post processing algorithm knew the vehicle was in a turn, the component of the lateral acceleration that was due to the turn could be estimated and correctly attributed. This would not be interpreted as a large roll angle but rather as a smaller roll angle combined with a turning operation. Similarly, these measured errors will also accumulate for commanded vehicle motions on a work machine or other type of machine.

The pitch gyroscope, roll gyroscope, and the yaw gyroscope of the IMU 240 provide ωx which is x component of sensed rotation, ωy which is y component of sensed rotation, and ωz which is z component of sensed rotation, respectively. The ωx, ωy, and ωz are measured over a period of time, Δt. Using these measurements, a 3×3 rotation matrix, R, is calculated to give the orientation (roll, pitch, and yaw) of the machine 100 relative to the earth. The change in the orientation of the machine 100 as it moves is the cross product, ΔR, determined as:

$$\Delta R = \omega_{Global} \Delta t \times R = R \times \omega_{Local} \Delta t$$

Using the cross product rule the formula becomes:

$$R \times \omega_{Body} = -\omega_{Body} \times R$$

So Rotation, R, at time t+Δt can be written as:

$$R_{t+\Delta t} = \left( I + \begin{bmatrix} 0 & \omega_z & -\omega_y \\ -\omega_z & 0 & \omega_x \\ \omega_y & -\omega_x & 0 \end{bmatrix} \Delta t \right) R_t$$

Generally, in vertical gyro algorithms, the data from the pitch accelerometer, roll accelerometer, yaw accelerometer, pitch gyroscope, roll gyroscope, and yaw gyroscope are combined. In one form, an assumption is zero or near zero average horizontal acceleration. This assumption assumes that the measured acceleration gives the direction of gravity. This assumption is then used to stabilize the roll and pitch so that the drift caused by the gyros does not degrade the measurements. This assumption simplifies the calculations as the direction of the measured acceleration is accounted for in the calculations, but the magnitude of the acceleration is not accounted for in the calculations. The roll accelerometer is used as a tilt sensor and the IMU 240 calculates the roll and pitch. Generally, a tilt sensor can measure the tilting in two axes of a reference plane. One way to measure tilt angle with reference to the earth's ground plane, is to use the accelerometer. Next, the roll and pitch is converted into a rotation matrix, R. The previous fusion output is used and the gyros are used to advance in time. The accelerometer and gyro measurements are fused using a weighted average with gain α<<1 by using a complementary filter.

$$R_{t+\Delta t} = \alpha R_{Tilt}(A_t) + (1-\alpha)(R_t + (-\omega_z \Delta t) \times R_t)$$

Generally, the complementary filter takes slow moving signals from the accelerometer and fast moving signals from the gyroscope and combines them. The accelerometer signals are passed through a low-pass filter and the gyroscope signals are passed through a high-pass filter and combined to give the final rate. The frequency response of the low-pass and high-pass filters add up to 1 at all frequencies. The vertical gyro algorithm behaves as a low pass filter on accelerations A and a high pass filter on rotations or ω. This means that at any given time the complete signal is subject to either low pass or high pass. However, the horizontal accelerations contribute significant error in the measured attitude of the sensor and replacing the complementary filter with a kalman filter does not change qualitative behavior. The kalman filter is a filter that performs a least squares estimate to combine the gyroscope measurements with the accelerometer measurements. The kalman filter uses the noise inherent to the sensors and the system to help determine how these measurements are combined. Similar to the complementary filter, the kalman filter tracks the expected noise in the signal.

One potential solution to the vertical gyro algorithm problem is to ignore the accelerometer during dynamic motions that exceed a threshold value.

If acceleration<threshold then: $_{(t+\Delta t)} = \alpha R_{Tilt}(A_t) + (1-\alpha)(R_t + (-\omega_z \Delta t) \times R_t)$ If acceleration>threshold then: $_{(t+\Delta t)} = (R_t + (-\omega^t \Delta t) \times R_t)$ The potential drawbacks to ignoring the accelerometer during dynamic motions are delay, and the gyroscopes tend to drift which is not constant and often difficult to track. Another drawback is the tradeoff between accuracy and stability of the accelerometer. The tradeoff between accuracy and stability can be further explained that if a threshold is used, then that threshold determines how accurate the system can be. If the threshold is very small, then the system will be very accurate when the threshold is met, but the system will not be accurate when it is outside the threshold. This means gyro drift will happen more often or for longer periods of time. If a large threshold is used, then the accelerometer measurement will be used more often thereby preventing gyro drift, but at the expense of allowing a larger range of non-gravitational accelerations to be acceptable. Since the algorithm assumes that gravity is in the direction of the measured acceleration, non-gravitational accelerations will contribute error to the resulting orientation. As such, an error is locked into the algorithm and the error continues while the machine is in use until the machine stops moving.

Another potential solution is to use a more complex algorithm with a built-in plant model. However, drawbacks to using a more complex algorithm include more computationally expensive, application specific to that particular model, and requires additional data communication.

The present application is directed to using a commanded machine motion to predict dynamic accelerations that are communicated to the IMU 240 and then combined with any measured dynamic accelerations by the IMU 240. The IMU 240 receives a predicted acceleration output from the controller 202 and thereafter adjusts a pitch measurement to create an adjusted pitch and also adjusts a roll measurement to create an adjusted roll. The IMU 240 sends the adjusted pitch and the adjusted roll to the controller 202.

The controller 202 will communicate the expected dynamics to the IMU 240. The IMU 240 then processes a compensated vertical gyro algorithm as:

$$R_{(t+\Delta t)} = \alpha R_{Tilt}(A_t - A_{Predicted}) + (1-\alpha)(R_t + (-\omega_z \Delta t) \times R_t)$$

It was discovered that using the compensated vertical gyro with horizontal accelerations that are predicted based on the commanded machine motion or the gross motion of the machine, will improve the accuracy of the machine 100, as described in the present application. The accuracy of the machine 100 using the vertical gyro with zero average horizontal acceleration will not be as accurate as compared to the compensated vertical gyro algorithm with horizontal accelerations that are predicted based on the commanded machine motion or the gross machine motion. In the original vertical gyro algorithm, all dynamic accelerations in the horizontal plane contribute error to the direction of the acceleration compared to gravity. In the compensated vertical gyro algorithm as described in the present application, the modeled or predicted accelerations are subtracted first, so only the dynamic accelerations that are not correctly predicted will contribute error to the direction of the acceleration which is a much smaller amount than the zero average horizontal acceleration.

It was discovered that the predicted acceleration based on commanded machine motion or gross machine motion can be calculated on a vehicular controller and communicated to the IMU where it is combined with the measured acceleration from the IMU in simple computations such as addition, subtraction, and multiplication, thereby avoiding complex calculations on the IMU. The combined or newly calculated pitch and roll accelerations are communicated from the IMU to the vehicular controller 202 for use with calculations on the vehicular controller 202. This disclosure can be directed to any type of machine having a hydrostatic drive, any type of gross motion of the machine, and any type of commanded machine motion. The IMU 240 can be a standalone component since it behaves as a vertical gyro in the absence of a correction signal. The correction signal can be tailored to other machines without changing an IMU data fusion algorithm that is stored on the IMU 240. The correction signal is based on a specific machine model which corresponds to how the turning rate and centripetal acceleration is calculated that is experienced by the IMU varies according to the type of machine the IMU is associated with. For example, the machine model is different on an ackerman steering machine like a car, an articulated machine like a loader or ADT, and a differential drive machine like a crawler or skid steer. Beneficially it was found there is limited communication required from the controller 202 to the IMU 240. Limited communication is beneficial because it reduces the load on the communication bus therebetween. Moreover, additional computations on the IMU 240 are limited to simple mathematical operations such as addition, subtraction, multiplication, and division. Limiting the mathematical operations reduces computational complexity for applying the algorithm which means there is no need to add computational resources to the IMU to implement the approach described in this disclosure.

Figure 3A:
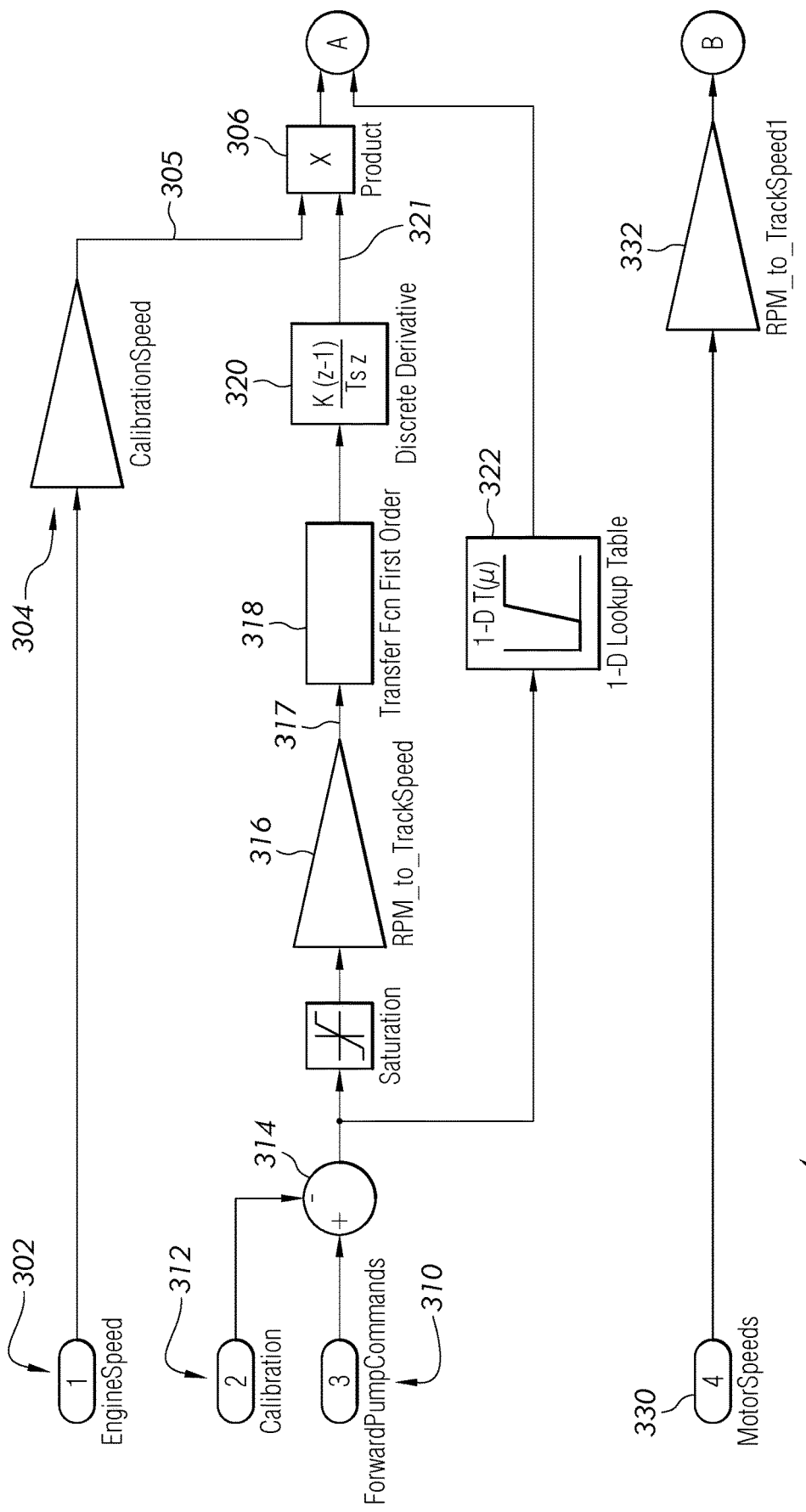
FIG. 3A is a first portion of a flow diagram of an acceleration prediction algorithm for the machine of FIG. 1.
Figure 3B:
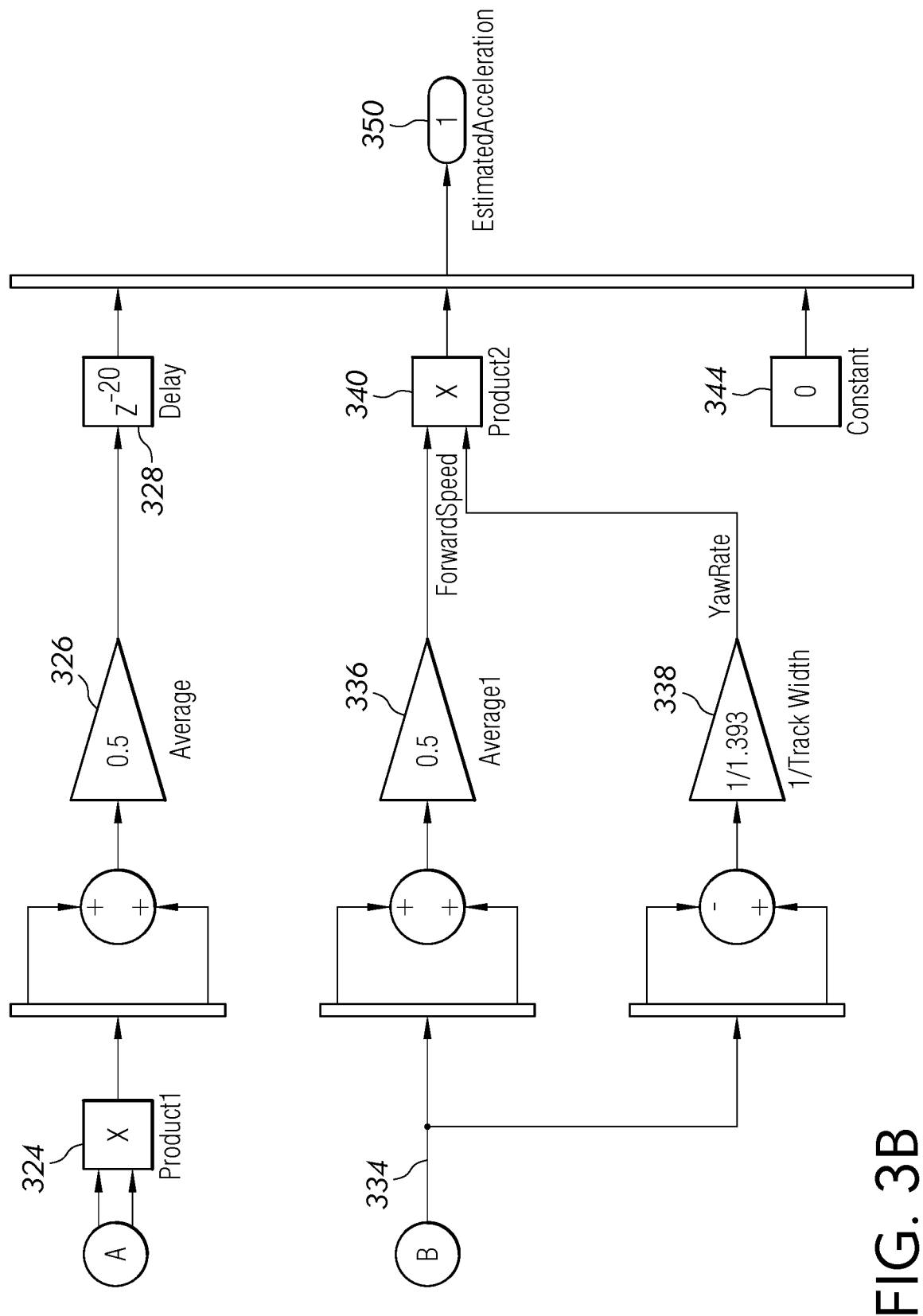
FIG. 3B is a second portion of the flow diagram of the acceleration prediction algorithm from FIG. 3A.

Another embodiment of the present disclosure is illustrated in FIGS. 3A and 3B. FIGS. 3A and 3B illustrate an acceleration prediction algorithm 300. The engine control unit 210 provides an engine speed 302 via the CAN bus 212 to the controller 202 where the engine speed 302 is normalized to a calibration parameter. To normalize the engine speed 302, a calculation is performed on the engine speed 302 using an assumed calibration speed 304 to determine an offset 305 that is combined with a derivative output 321 from the derivative step 320 to form a first product 306. The engine speed 302 is divided by the assumed calibration speed 304 to determine the offset 305.

The controller 202 provides a pump command 310 that includes a pump displacement or flow measurement via the pump command communication link 232 to the hydrostat pump 230. The pump command 310 is a first order transfer function between the pump command and the actual pump displacement which is characterized in a characterization step that can be used to apply the algorithm on the machine 100. The hydrostat pump 230 uses a second assumed calibration 312 that is internal to the pump controller to determine a pump output 314. In one embodiment, the pump controller includes computer software that calculates the relationship between the pump command 310 and track speed as described in more detail below. The pump output 314 can be determined for forward travel as well as reverse travel. The calibration is performed the same in forward and reverse but there may be different offsets and slopes in each direction. Next in a conversion step 316, the pump output 314 is converted to a motor speed using a sprocket radius of the machine 100 wherein motor speed is a function of displacement and flow. The motor speed is converted to a track speed 317 in the following equation:

Track Speed=Motor Speed*Gear Reduction*Equivalent Sprocket Radius

Next in transfer step 318, a hydrostatic transmission is modeled by a first order discrete transfer function and corrected using test data. The first order discrete transfer function in frequency domain and computed with the following equation:

Output=Input*Gain/($tau$*s+1) where the gain and time constant are based on a characterization of the system.

Next in discrete derivative step 320, a numerical differentiation is performed on the filtered signal. The discrete derivative step 320 determines the difference between the commanded pump displacement and the actual pump displacement. A filtered acceleration is determined for each of the left and right tracks, then an average filtered acceleration of the left track and right tracks is determined. A discrete derivative output 321 is combined with the offset 305 to form the first product 306. The discrete derivative output 321 is calculated with the following equation:

Derivative=(Current−Previous)/Timestep

The pump output 314 is used in a table lookup step 322 to account for changes in the relationship between the pump command and the track speed due to efficiency changes in the hydrostat pump 230 as pump displacement changes. The table lookup step 322 is not necessary but can improve the accuracy of the algorithm. The table lookup step 322 is a factor to compensate for changes in the efficiency of a variable displacement hydraulic pump as the displacement changes. The table lookup step 322 can vary depending on the efficiency desired for the algorithm. The first product 306 is combined with the table lookup step 322 to form a second product 324 that is an expected motor acceleration that is transferred from the controller 202 via the CAN bus 242 to the IMU 240. The second product 324 includes a left expected motor acceleration and a right expected motor acceleration that are averaged as average expected motor acceleration 326. A time delay 328 can be applied to the average expected motor acceleration 326 to correlate the average expected motor acceleration 326 to the machine 100 and account for the time delay in the right and left hydrostatic transmissions. The time delay 328 can be adjusted as necessary and may not be applied to the average expected motor acceleration 326.

The hydrostat motor 234 provides a motor or transmission speed 330 via the motor communication link 236 to the controller 202 that is converted by the processor 206 to a track speed 334 in a second conversion step 332. As such, the motor or transmission speed 330 is converted by the processor 206 to the track speed 334 using a sprocket radius of the machine 100 wherein motor speed is a function of displacement and flow of the hydrostat motor 234.

Pump Flow=Pump Shaft Speed*Displacement*Volumetric Efficiency

Motor Speed=Motor Flow*Volumetric Efficiency/ Motor Displacement

The track speed 334 is computed for each of the first track assembly 106 and the second track assembly 108 and then these values are averaged as a vehicle speed 336. The vehicle speed 336 is the current vehicle speed of the work machine 100. The difference between the track speed 334 for the first track assembly 106 and the track speed 334 for the second track assembly 108 divided by the track width is a current vehicle yaw rate 338. Generally, these computations assume no slip for the work machine 100 wherein the first track assembly 106 and the second track assembly 108 travel or roll on a surface without any skidding. The yaw rate 338 is multiplied by the vehicle speed 336 to give an expected or predicted acceleration 340 of the work machine 100. The expected or predicted acceleration 340 includes a left expected or predicted acceleration for the left hydrostatic transmission and a right expected or predicted acceleration for the right hydrostatic transmission.

An IMU reading 344 accounts for accelerometer and gyro measurements that the IMU 240 is sensing and sending to the vehicle controller 202. The average expected motor acceleration 326 with or without the time delay 328 affect is averaged with the predicted acceleration 340 and sent to the IMU 240 to be combined or processed with the IMU reading 344 as an estimated acceleration 350.

The IMU 240 receives the predicted acceleration 340 and the expected motor acceleration 326 to improve the accuracy of the sensed pitch, Ay, and roll, Ax, accelerations. The application discloses a technique to improve the accuracy of the pitch and roll accelerations and display this effect on the display 250 so the operator can have a better measurement of the grade the machine 100.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A method for adjusting acceleration for a machine, the method comprising:
providing a machine having a vehicular controller, an inertial measurement unit including an inertial measurement unit controller, and an operator control;
commanding with the operator control the machine to move from a first position to a second position;
predicting an acceleration based on the commanded machine motion from the first position to the second position;
communicating the predicted acceleration from the vehicular controller to the inertial measurement unit controller;
measuring a current acceleration with the inertial measurement unit;
determining an adjusted acceleration from the combination of the predicted acceleration and the current acceleration using the inertial measurement unit controller; and
communicating the adjusted acceleration from the inertial measurement unit controller to the vehicular controller.

2. The method of claim 1, wherein the predicted acceleration includes a predicted pitch measurement and a predicted roll measurement.

3. The method of claim 1, wherein the adjusted acceleration includes an adjusted pitch measurement and an adjusted roll measurement.

4. The method of claim 1, further comprising:
determining an orientation of the machine that accounts for the adjusted acceleration on the IMU; and
communicating the orientation from the IMU to the vehicular controller.

5. The method of claim 1, wherein the determining the adjusted acceleration is calculated with the algorithm $R_{(t+\Delta t)} = \alpha R_{Tilt}(A_t - A_{Predicted}) + (1-\alpha)(R_t + (-\omega_t \Delta t) \times R_t)$.

6. The method of claim 1, wherein the machine includes a right hydrostatic transmission and a left hydrostatic transmission.

7. The method of claim 1, wherein the machine includes a linkage and a chassis, and the commanded machine motion includes moving the linkage relative to the chassis.

8. The method of claim 1, further comprising:
displaying the adjusted acceleration on a display of the machine.

9. A method for adjusting acceleration for a machine, the method comprising:
providing a machine having a vehicular controller, an inertial measurement unit including an inertial measurement unit controller, a hydrostatic transmission, and an operator control;
moving the machine a commanded machine motion that includes movement of the machine from a first position to a second position;
predicting an acceleration based on the commanded machine motion;
communicating the predicted acceleration from the vehicular controller to the inertial measurement unit controller;
measuring a current acceleration with the inertial measurement unit; and
determining an adjusted acceleration from the combination of the predicted acceleration and the current acceleration using the inertial measurement unit controller.

10. The method of claim 9, wherein the commanded machine motion includes moving the machine in a reverse direction.

11. The method of claim 9, wherein the commanded machine motion includes moving the machine in a forward direction.

12. The method of claim 9, wherein the machine includes a chassis and a linkage, and the commanded machine motion includes moving the linkage relative to the chassis.

13. The method of claim 9, wherein the commanded machine motion includes gross machine motion.

14. The method of claim 9, wherein the determining the adjusted acceleration is calculated with the algorithm $R_{(t+\Delta t)} = \alpha R_{Tilt}(A_t - A_{Predicted}) + (1-\alpha)(R_t + (-\omega_t \Delta t) \times R_t)$.

15. The method of claim 9, further comprising:
determining an orientation of the machine that accounts for the adjusted acceleration on the IMU; and
communicating the orientation from the IMU to the vehicular controller.

16. The method of claim 9, wherein the IMU includes one or more accelerometer sensors and one or more gyroscope sensors.

17. The method of claim 9, wherein the predicted acceleration includes a predicted pitch acceleration measurement and a predicted roll acceleration measurement.

18. The method of claim 9, wherein the adjusted acceleration includes an adjusted pitch acceleration measurement and an adjusted roll acceleration measurement.

19. The method of claim 9, further comprising:
communicating the adjusted acceleration from the inertial measurement unit controller to the vehicular controller.

* * * * *